United States Patent
Van Hecke et al.

(10) Patent No.: US 10,609,210 B2
(45) Date of Patent: Mar. 31, 2020

(54) SYSTEMS AND METHODS FOR ADAPTIVE AND PREDICTABLE GRAPHICAL USER INTERFACES

(71) Applicant: Facebook, Inc., Menlo Park, CA (US)

(72) Inventors: William Christopher Van Hecke, Mountain View, CA (US); Áthila Armstrong Machado Santos, San Francisco, CA (US); Alexa Andrzejewski, San Francisco, CA (US); John Evans, San Francisco, CA (US); Cristobal Alvaro Castilla Lacomba, San Francisco, CA (US); Christine Serrone Gray, Sunnyvale, CA (US); Arthur Bodolec, San Francisco, CA (US); Laura Ling Javier, Burlingame, CA (US); Ryan Lee, Oakland, CA (US); Jessica Drum, San Francisco, CA (US); Matthew Paul Viscomi, Redwood City, CA (US)

(73) Assignee: Facebook, Inc., Menlo Park, CA (US)

( * ) Notice: Subject to any disclaimer, the term of this patent is extended or adjusted under 35 U.S.C. 154(b) by 69 days.

(21) Appl. No.: 15/720,836

(22) Filed: Sep. 29, 2017

(65) Prior Publication Data

US 2019/0104216 A1    Apr. 4, 2019

(51) Int. Cl.
| | | |
|---|---|---|
| G06F 3/0488 | (2013.01) | |
| G06F 3/0482 | (2013.01) | |
| H04M 1/725 | (2006.01) | |
| G06F 3/0481 | (2013.01) | |

(52) U.S. Cl.
CPC ...... *H04M 1/72586* (2013.01); *G06F 3/0482* (2013.01); *G06F 3/0488* (2013.01); *G06F 3/04817* (2013.01)

(58) Field of Classification Search
CPC .................................................. G06F 3/0482
See application file for complete search history.

(56) References Cited

U.S. PATENT DOCUMENTS

| | | | |
|---|---|---|---|
| 8,799,758 B2* | 8/2014 | Szeto .................. G06F 3/00 |
| 2009/0013275 A1* | 1/2009 | May et al. ............... G06F 3/048 |
| 2011/0252346 A1* | 10/2011 | Chaudhri ................ G06F 3/048 |
| 2014/0337791 A1* | 11/2014 | Agnetta et al. ........ G06F 3/0488 |
| 2017/0336944 A1* | 11/2017 | Liu ........................ G06F 3/0481 |
| 2018/0188906 A1* | 7/2018 | Carter ................... G06F 3/0482 |

* cited by examiner

Primary Examiner — James J Debrow
(74) Attorney, Agent, or Firm — FisherBroyles, LLP

(57) ABSTRACT

A computer-implemented method may include (i) identifying a set of launch icons for a graphical user interface, where each launch icon within the set of launch icons navigates to a corresponding activity within a set of activities when selected via the graphical user interface, (ii) selecting, from the set of activities and based on at least one recommendation criterion, a smaller subset of recommended activities for a user, (iii) displaying, via the graphical user interface, a dock that includes a subset of launch icons corresponding to the subset of recommended activities, (iv) receiving, via the graphical user interface, an input to view a drawer element that includes each launch icon within the set of launch icons, and (v) presenting, via the graphical user interface, the drawer element in response to receiving the input. Various other methods, systems, and computer-readable media are also disclosed.

19 Claims, 7 Drawing Sheets

Method
100

```
                    ┌─────────┐
                    │  Start  │
                    └────┬────┘
                         ▼
┌──────────────────────────────────────────────────────────────────┐
│ Identify a set of launch icons for a graphical user interface,   │
│ each launch icon within the set of launch icons navigating to a  │
│ corresponding activity within a set of activities when selected  │
│ via the graphical user interface                                 │
│ 102                                                              │
└──────────────────────────────┬───────────────────────────────────┘
                               ▼
┌──────────────────────────────────────────────────────────────────┐
│ Select, from the set of activities and based on at least one     │
│ recommendation criterion, a smaller subset of recommended        │
│ activities for a user that interacts with the graphical user     │
│ interface                                                        │
│ 104                                                              │
└──────────────────────────────┬───────────────────────────────────┘
                               ▼
┌──────────────────────────────────────────────────────────────────┐
│ Display, via the graphical user interface, a dock that includes  │
│ a subset of launch icons corresponding to the subset of          │
│ recommended activities                                           │
│ 106                                                              │
└──────────────────────────────┬───────────────────────────────────┘
                               ▼
┌──────────────────────────────────────────────────────────────────┐
│ Receive, via the graphical user interface, an input to view a    │
│ drawer element, where the drawer element includes each launch    │
│ icon within the set of launch icons                              │
│ 108                                                              │
└──────────────────────────────┬───────────────────────────────────┘
                               ▼
┌──────────────────────────────────────────────────────────────────┐
│ Present, via the graphical user interface, the drawer element    │
│ in response to receiving the input                               │
│ 110                                                              │
└──────────────────────────────┬───────────────────────────────────┘
                               ▼
                         ┌─────────┐
                         │   End   │
                         └─────────┘
```

FIG. 1

SYSTEMS AND METHODS FOR ADAPTIVE AND PREDICTABLE GRAPHICAL USER INTERFACES

BACKGROUND

In the digital age, users have an ever-increasing array of applications and services to choose from that may provide new experiences, open up new ways of connecting with others, or help them to organize their lives. While increasing user choices can be empowering, it can also overwhelm or confuse users with irrelevant choices. As applications proliferate, graphical user interfaces to locate, select, and navigate between applications become increasingly important to an improved user experience.

Traditional graphical user interfaces may inadequately address the paradox of choice. For example, a clutter of icons may make locating and selecting a specific icon more difficult. In addition, users may be less likely to discover new applications of potential interest when faced with long lists of choices. Instead, users may adapt to crowded interfaces by habitually ignoring any unfamiliar or never-before used interface elements, potentially representing significant losses in value to the user.

Conversely, updates to a graphical user interface that attempt to shepherd users toward specific applications may confuse and frustrate users, making previously favored applications difficult to find while failing to engage users with new or previously undiscovered options.

SUMMARY

The disclosure provided herein describes and illustrates various systems and methods for providing adaptive and predictable graphical user interfaces. As will be explained in greater detail below, a persistent dock element may dynamically display icons for selected (e.g., context-relevant) activities while an openable drawer element may display a more comprehensive set of icons (e.g., for all available activities) in a predictable, ordered arrangement.

In one example, a method for providing adaptive and predictable graphical user interfaces may include (i) identifying a set of launch icons for a graphical user interface, where each launch icon within the set of launch icons navigates to a corresponding activity within a set of activities when selected via the graphical user interface, (ii) selecting, from the set of activities and based on at least one recommendation criterion, a smaller subset of recommended activities for a user that interacts with the graphical user interface, (iii) displaying, via the graphical user interface, a dock that includes a subset of launch icons corresponding to the subset of recommended activities, (iv) receiving, via the graphical user interface, an input to view a drawer element that includes each launch icon within the set of launch icons, and (v) presenting, via the graphical user interface, the drawer element in response to receiving the input.

In some examples, the method may also include dynamically modifying the dock to include an additional launch icon from the set of launch icons corresponding to an additional recommended activity from the set of activities in response to determining that the additional recommended activity meets the at least one recommendation criterion. In one example, dynamically modifying the dock to include the additional launch icon may include modifying the dock to include the additional launch icon proximate to a currently selected launch icon within the dock responsive to the currently selected launch icon being currently selected. In some examples, the method may include modifying the dock to remove a lapsed launch icon corresponding to a lapsed activity from the dock in response to determining that the lapsed activity is not currently recommended to the user.

The recommendation criterion may include any of a variety of criteria. For example, the recommendation criterion may include determining, based on non-user-entered sensor data, that a candidate activity within the set of activities is relevant to the user. In some examples, the recommendation criterion may include (i) determining a characteristic of the user's physical environment based on the non-user-entered sensor data and (ii) determining that the characteristic of the user's physical environment provides a parameter that is consumable by the candidate activity. Additionally or alternatively, the recommendation criterion may include (i) determining a characteristic of the user's physical environment based on the non-user-entered sensor data and (ii) determining that the characteristic of the user's physical environment provides a parameter that is consumable by the candidate activity.

In some embodiments, the recommendation criterion may include determining, based on data specific to the user stored in relation to a first activity within the set of activities, that a second activity within the set of activities is currently relevant to the user. In some examples, the recommendation criterion may include determining that another user that is connected to the user according to stored relationship data has used a candidate activity within the set of activities. In some additional examples, the recommendation criterion may include identifying a recommendation of a candidate activity from a vendor of the candidate activity. In some embodiments, the recommendation criterion may include determining (i) how recently a candidate activity was accessed by the user and/or (ii) how frequently the candidate activity was accessed by the user.

In some examples, receiving the input to view the drawer element may include receiving the input via an interaction with the dock within the graphical user interface. According to some examples, selecting the smaller subset of recommended activities may include (i) selecting a first recommended activity based at least in part on a first recommendation criterion and (ii) selecting a second recommended activity based at least in part on a second recommendation criterion.

The drawer element may present launch icons in any suitable manner. For example, the drawer element may present each launch icon within the set of launch icons ordered according to a single characteristic of the respective launch icons within the set of launch icons. In some examples, the drawer element may present each launch icon within the set of launch icons in an order based on information about the set of launch icons that is available to the user.

According to some embodiments, the dock may be persistently visible within the graphical user interface in a default viewing mode and the drawer may not visible within the graphical user interface in the default viewing mode until the user selects the drawer via the graphical user interface. In some examples, the graphical user interface may display a single activity within the plurality of activities at a time.

In addition, a corresponding system for providing adaptive and predictable graphical user interfaces may include (i) an identification module, stored in memory, that identifies a set of launch icons for a graphical user interface, where each launch icon within the set of launch icons navigates to a corresponding activity within a set of activities when selected via the graphical user interface, (ii) a selection module, stored in memory, that selects, from the set of activities and based on at least one recommendation criterion, a smaller subset of recommended activities for a user that interacts with the graphical user interface, (iii) a displaying module, stored in memory, that displays, via the graphical user interface, a dock that includes a subset of launch icons corresponding to the subset of recommended activities, (iv) a receiving module, stored in memory, that receives, via the graphical user interface, an input to view a drawer element that includes each launch icon within the set of launch icons, (v) a presentation module, stored in memory, that presents, via the graphical user interface, the drawer element in response to receiving the input, and (vi) at least one physical processor that executes the identification module, the selection module, the displaying module, the receiving module, and the presentation module.

In some examples, the above-described method may be encoded as computer-readable instructions on a computer-readable medium. For example, a computer-readable medium may include one or more computer-executable instructions that, when executed by at least one processor of a computing device, may cause the computing device to (i) identify a set of launch icons for a graphical user interface, where each launch icon within the set of launch icons navigates to a corresponding activity within a set of activities when selected via the graphical user interface, (ii) select, from the set of activities and based on at least one recommendation criterion, a smaller subset of recommended activities for a user that interacts with the graphical user interface, (iii) display, via the graphical user interface, a dock that includes a subset of launch icons corresponding to the subset of recommended activities, (iv) receive, via the graphical user interface, an input to view a drawer element that includes each launch icon within the set of launch icons, and (v) present, via the graphical user interface, the drawer element in response to receiving the input.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

FIG. 1 is a flow diagram of an exemplary method for providing adaptive and predictable graphical user interfaces.

Figure 2:
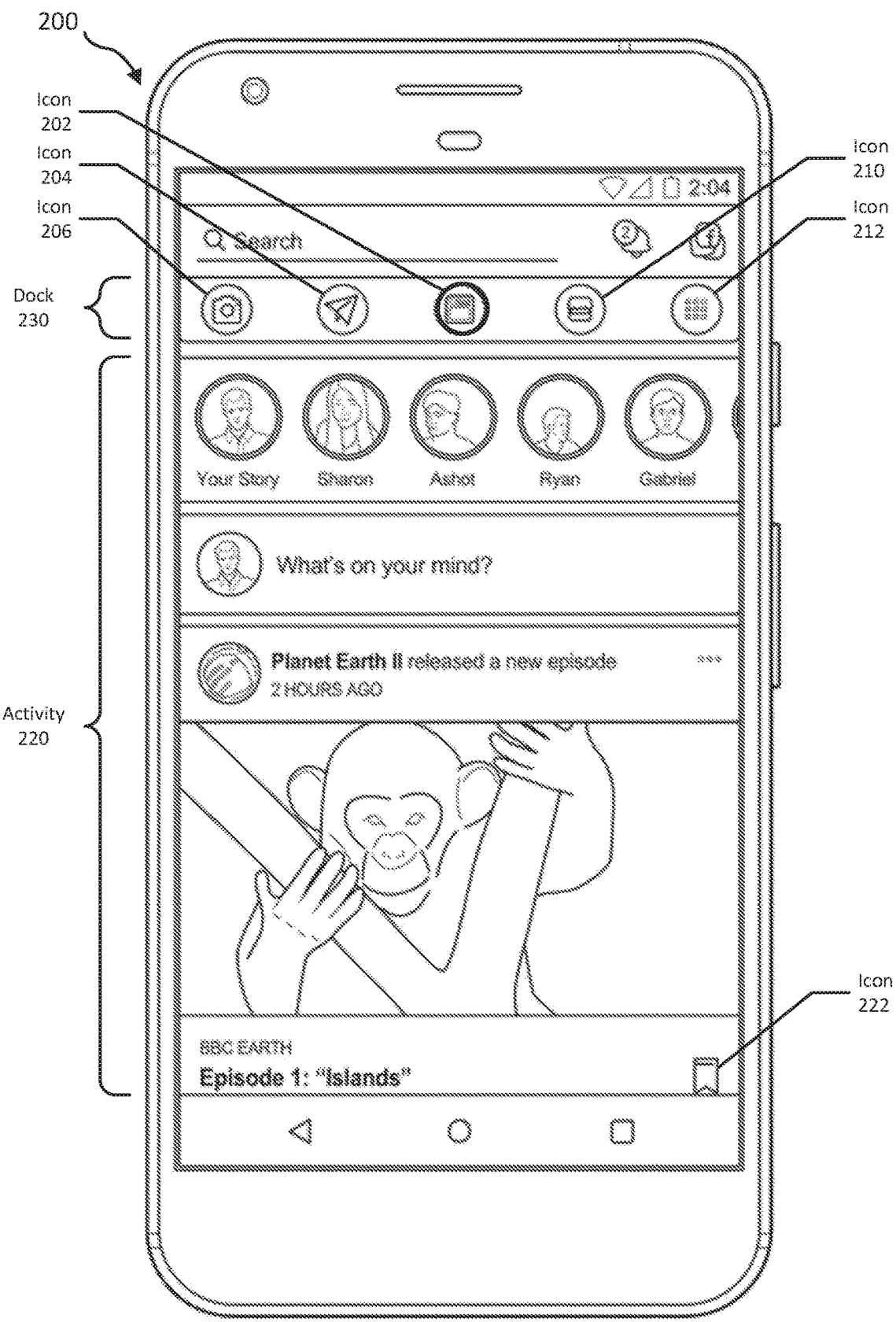
FIG. 2 is an illustration of an exemplary graphical user interface.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for providing adaptive and predictable graphical user interfaces. As will be explained in greater detail below, by integrating a persistent dock element that dynamically display icons for selected (e.g., context-relevant) activities with an openable drawer element that displays a more comprehensive set of icons (e.g., for all available activities) in a predictable, ordered arrangement, the systems and methods described herein may enable users to easily find specific applications as desired while also helping users to discover and/or quickly access relevant applications.

In addition, the systems and methods described herein may improve the functioning of computing devices. For example, the systems and methods described herein may improve the functioning of a computing device by improving a graphical user interface used to operate the computing device. In particular, these systems and methods may improve a computing device by making it easier for users to discover, locate, and/or navigate to relevant applications while minimizing user frustration or confusion when attempting to operate the computing device. In some examples, these systems and methods may more effectively unlock the advantages of applications installed on a user's computing device by providing a graphical user interface that helps a user to access applications when needed and to discover (or rediscover) applications that might otherwise be ignored or neglected.

The following will provide, with reference to FIG. 1, detailed descriptions of a computer-implemented method for providing adaptive and predictable graphical user interfaces. In addition, detailed descriptions of a corresponding system for providing adaptive and predictable graphical user interfaces will be provided in connection with FIG. 7. Furthermore, detailed descriptions of example graphical user interfaces will be provided in connection with FIGS. 2-6.

FIG. 1 is a flow diagram of an example computer-implemented method 100 for providing adaptive and predictable graphical user interfaces. The steps shown in FIG. 1 may be performed by any suitable computer-executable code and/or computing system, including system 700 in FIG. 7 and/or variations or combinations of one or more of the same. In one example, each of the steps shown in FIG. 1 may represent an algorithm whose structure includes and/or is represented by multiple sub-steps, examples of which will be provided in greater detail below.

As illustrated in FIG. 1, at step 102 one or more of the systems described herein may identify a set of launch icons for a graphical user interface, where each launch icon within the set of launch icons navigates to a corresponding activity within a set of activities when selected via the graphical user interface.

The term "graphical user interface," as used herein, generally refers to any interface providing visual elements that allows a user to interact with a computing device. In some examples, the graphical user interface may provide an interface for an operating environment of a computing device. Additionally or alternatively, the graphical user interface may provide an interface for a home screen and/or start screen of a computing system. In some examples, the graphical user interface may provide an interface for an application. For example, the graphical user interface may provide an interface for a social media application.

In some examples, the graphical user interface may operate under various constraints. For example, the graphical user interface may act as an interface to a mobile computing device. Accordingly, in some examples, the graphical user interface may be space-constrained (e.g., relative to a desktop display). Additionally or alternatively, the graphical user interface may primarily receive inputs via a touchscreen (e.g., via gestures such as tapping or swiping a finger on the touchscreen).

As used herein, the term "activity" may refer to any application, application activity, application view, and/or activity-associated data item. Thus, in some examples, the set of activities may include distinct applications. In some examples, the set of activities may include different application activities within a single application (e.g., different single-page views geared to presenting specified features of an application). In some examples, an activity-associated data item may include a parameter and/or data object that pertains to an activity and that, when accessed, is loaded as a view within the activity. For example, a specific contact may represent an activity-associated data item for a contacts application. As another example, a specific calendar item may represent an activity-associated data item for a calendar application.

As used herein, the term "icon" may refer to any image or graphical representation that may be selectable within a graphical user interface. Accordingly, as used herein, the term "launch icon" may refer to any icon that may be used to launch, activate, select, designate, and/or represent an activity within a graphical user interface.

The systems described herein may identify the set of launch icons in any suitable manner. In some examples, identifying the set of launch icons may involve parsing a configuration file that designates the set of launch icons. In addition, identifying the set of launch icons may involve parsing an activity manifest that specifies a launch icon for an activity. Additionally or alternatively, identifying the set of launch icons may include loading the launch icons from storage into memory. In some examples, identifying the set of launch icons may include identifying the set of launch icons loaded into one or more data structures.

Returning to FIG. 1, at step 104 one or more of the systems described herein may select, from the set of activities and based on at least one recommendation criterion, a smaller subset of recommended activities for a user that interacts with the graphical user interface.

As used herein, the term "subset" may refer to any suitable number of items. In some examples, a subset may include only a single item. Thus, the "subset of recommended activities" may, in some examples, include only a single activity. Likewise, a "subset of launch icons" may, in some examples, refer to only a single launch icon.

The systems described herein may select the set of activities in any of a variety of ways. For example, these systems may select the subset of recommended activities as a part of loading the graphical user interface. Additionally or alternatively, these systems may select the subset of recommended activities over time and/or dynamically modify the subset of recommended activities in response to user activity, the state of the graphical user interface, new contextual information, and/or the passage of time. For example, as will be explained in greater detail below, the systems described herein may display launch icons corresponding to the subset of recommended activities within a dock. In some examples, these systems may dynamically add to the dock and/or remove from the dock launch icons corresponding to recommended activities (e.g., as the subset of recommended activities changes).

The recommendation criterion may include any of a variety of criteria. In some examples, the recommendation criterion may include determining, based on non-user-entered sensor data, that a candidate activity within the set of activities is relevant to the user. Examples of non-user-entered sensor data may include, without limitation, location data (e.g., from a Global Positioning System (GPS)), camera data (e.g., images observed by a camera sensor), accelerometer data, ambient light data, and/or any other data that may be passively collected by one or more sensors integrated with, connected to, controlled by, and/or in communication with a computing device. For example, the systems described herein may select an activity based on a physical location of the user (e.g., based on sensor data from a GPS of the computing device). As a specific example, these systems may select a reviewing application and/or a payment application based on determining that the user is in a place of business. In another example, the systems described herein may select an activity based on movement of the user (e.g., based on sensor data from an accelerometer of the computing device). In one specific example, the systems described herein may select an exercise tracking application based on determining that the user is walking (and/or based on determining that the user habitually walks). In another specific example, the systems described herein may select a navigation application based on determining that the user is in a vehicle. In another example, the systems described herein may select a sky chart application (e.g., based on a light sensor indicating, in combination with clock data, that the user may be outside in the dark of night).

In some examples, the recommendation criterion may include determining a characteristic of the user's physical environment based on the non-user-entered sensor data and determining that the characteristic of the user's physical environment provides a parameter that is consumable by the candidate activity. Returning to the earlier example of determining that the user is in a place of business based on GPS data, the systems described herein may additionally determine that the identity of the business provides a parameter consumable by the reviewing application (i.e., the reviewing application may take the identity of the business as a parameter) As will be explained in greater detail below, selecting a launch icon within the graphical user interface may launch the corresponding activity. In some examples, selecting a launch icon for a recommended activity may launch the recommended activity with a parameter relating to the recommendation. For example, if a launch icon is presented for a reviewing application on the basis of the user visiting a particular business, the launch icon may be configured to navigate to a view within the reviewing application for reviewing the particular business.

As discussed above, in some examples the recommendation criterion may include determining a characteristic of the user's physical environment based on the non-user-entered sensor data. In various examples, the recommendation criterion may further include determining, based on a predefined specification and based at least in part on the characteristic, that the candidate activity is suited for the user's physical environment. For example, a specification for an activity may specify sensor data that, when observed, would indicate that the application would be relevant.

In some examples, the recommendation criterion may include determining, based on data specific to the user stored in relation to a candidate activity within the set of activities, that the candidate activity is currently relevant to the user. For example, appointments for a user may be stored within a calendar application. In this example, systems described herein may select the calendar application at or near the time of a stored appointment.

In some examples, the recommendation criterion may include determining, based on data specific to the user stored in relation to a first activity within the set of activities, that a second activity within the set of activities is currently relevant to the user. Returning to the example of a calendar application storing appointments for a user, in some examples the systems described herein may select a different application (in addition to or instead of the calendar application) based on the contents of the appointment. For example, the systems described herein may select a camera application based on the appointment being for a celebratory event such as a birthday or a wedding.

A user's friends or family may also indirectly influence the selection of activities. In some examples, the recommendation criterion may include determining that another user that is connected to the user according to stored relationship data has used a candidate activity within the set of activities. For example, the systems described herein may determine that a messaging application is popular with the user's social network and select the messaging application on that basis.

In some examples, the recommendation criterion may include identifying a recommendation of a candidate activity from a vendor of the candidate activity. For example, the systems described herein may select an activity at least partly due to a campaign by the vendor of the activity. In some examples, a vendor-sponsored campaign for an activity may target the user specifically (e.g., based on the user's activity patterns, demographic information, etc.). In some examples, a vendor-sponsored campaign for an activity may span a specified period of time. Accordingly, the systems described herein may select the activity responsive to determining that the campaign for the activity targets the user and is currently active.

In some examples, the recommendation criterion may include determining how recently a candidate activity was accessed by the user. For example, the systems described herein may select an activity based on determining that the activity was recently accessed by the user (e.g., meeting a predetermined threshold for recency). Additionally or alternatively, the recommendation criterion may include determining how frequently the candidate activity was accessed by the user. For example, the systems described herein may select an activity based on determining that the activity has been frequently accessed by the user (e.g., meeting a predetermined threshold for frequency).

In some examples, the recommendation criterion may include the user indirectly interacting with an activity. For example, as a user interacts with an application, the user's interactions may generate data that is provided to a second application. Accordingly, the systems described herein may select the second application. As a specific example, a user may, within a social feed application, bookmark a video. The social feed application may register the bookmark with a video application. Thus, the systems described herein may select the video application responsive to the user bookmarking the video within the social feed application.

As detailed above, the systems described herein may use any of a wide variety of recommendation criteria to select one or more recommended activities. However, as will be explained in greater detail below, the space for dynamically selected launch icons for recommended activities may be limited (e.g., to six, to two, or even to just one). Accordingly, in some examples, the systems described herein may prioritize the selection of the subset of recommended activities. For example, the systems described herein may use a scoring system (e.g., applying scores to candidate activities in light of recommendation criteria) to prioritize the selection of an activity. Additionally or alternatively, the systems described herein may queue recommended activities (e.g., on a first-in-first-out basis). In some examples, some recommendation criteria may apply to immediate situations (e.g., based on a recent action performed by the user, based on a current location of the user, based on an upcoming appointment n the user's calendar, etc.), while other recommendation criteria may apply in the long-term (e.g., based on many friends using an activity over time, based on a user's observed interests, etc.). Accordingly, the systems described herein may prioritize immediately relevant activities over activities of general relevance to the user.

In addition, in some examples the systems described herein may select different activities based on different recommendation criteria. For example, the systems described herein may select a first recommended activity based at least in part on a first recommendation criterion and select a second recommended activity based at least in part on a second recommendation criterion. As a specific example, the systems described herein may select an activity based on stored data relating to the user (e.g., calendar data). These systems may select another activity based on sensor data (e.g., GPS data). These systems may select yet another activity based on a vendor campaign to promote the activity. In addition, as will be explained in greater detail below, in some examples the systems described herein may reserve certain slots for activities recommend on specific bases (e.g., one slot for vendor-recommended activities, two slots for activities recommended on the basis of calendar data and/or sensor data, and one slot for frequently accessed activities).

The systems described herein may select the subset of recommended activities according to any suitable timetable. In some examples, the systems described herein may select at least a part of the subset when the graphical user interface (and/or an application that uses the graphical user interface) is updated. In some examples, the systems described herein may select at least a part of the subset when a user takes a specific action (e.g., accessing an item related to an activity). In some examples, the systems described herein may select at least a part of the subset on a daily basis. In some examples, the systems described herein may select at least a part of the subset when a new session is started (and, therefore, the graphical user interface is initiated). In some examples, the systems described herein mays select at least a part of the subset in the course of a session (e.g., as the user is interacting with the graphical user interface).

Returning to FIG. 1, at step 106 the systems described herein may display, via the graphical user interface, a dock that includes a subset of launch icons corresponding to the subset of recommended activities.

As used herein, the term "dock" may refer to any area within a graphical user interface that may be designated to include launch icons for the subset of recommended activities. In some examples, the term "dock" may refer to a persistent and/or quasi-persistent element within the graphical user interface. In some examples, the dock may appear within the graphical user interface at all times. In some examples, the dock may appear within the graphical user interface in a default navigation mode (e.g., during which an application is visible while other elements for navigating between applications are also visible), but disappear under certain alternate modes (e.g., during a full-screen viewing mode, during which only the contents of an application may be visible, removing the dock, status bars, and other interface elements from view). In some examples, the dock may disappear when the graphical user interface is in disuse but immediately reappear when the user interacts with the graphical user interface.

As discussed earlier, in some examples the systems described herein may dynamically modify the subset of recommended activities (e.g., during an active session with the user and the graphical user interface). Accordingly, the systems described herein may dynamically modify the dock to show the corresponding launch icons. For example, the systems described herein may dynamically modify the dock to include an additional launch icon from the set of launch icons corresponding to an additional recommended activity from the set of activities in response to determining that the additional recommended activity meets a recommendation criterion. In some examples, the systems described herein may place the additional launch icon within the dock to be adjacent to a currently selected launch icon based on the currently selected launch icon being currently selected. For example, as will be explained in greater detail below, in some examples a user may navigate through the activities represented in the dock by the launch icons in the dock by sequentially scrolling, swiping, and/or flipping through the activities in the order in which they are represented in the dock. Accordingly, by placing a newly added activity next to a currently selected activity within the dock, a user may quickly navigate to the newly added activity by sequentially navigating from the currently selected activity to the newly added activity.

In some examples, the systems described herein may dynamically modify the dock to remove a lapsed launch icon corresponding to a lapsed activity from the dock in response to determining that the lapsed activity is not currently recommended to the user. Additionally or alternatively, these systems may remove the lapsed launch icon from the dock to make space for another activity that is recommended to the user at a higher priority. An activity may lapse according to any of a variety of criteria, including a recommendation score falling below a threshold, a user having taken an action that fulfills the recommendation (i.e., the user navigating to the activity and consuming newly added content that gave rise to the recommendation), a change in context that moots the recommendation (i.e., accelerometer data indicates that the user is no longer in a vehicle and, so, the systems described herein remove a navigation application from the dock), etc.

While the dock may include the subset of launch icons corresponding to the subset of recommended activities, in some examples the dock may include additional elements. For example, the dock may include launch icons for statically set activities. Additionally or alternatively, the dock may include one or more user-pinned launch icons. In some examples, as will be discussed in greater detail below, the dock may include an interface element to access a drawer element.

Returning to FIG. 1, at step 108 the systems described herein may receive, via the graphical user interface, an input to view a drawer element, where the drawer element includes each launch icon within the set of launch icons.

As used herein, the term "drawer element" may include any interface element that may contain launch icons. In various examples, as may be appreciated, the drawer element may contain more launch icons than the dock. In addition, in various examples the drawer element may, when opened, consume more display area than the dock.

The systems described herein may receive the input in any suitable form. For example, the user may select an icon within the dock that represents the drawer element. Additionally or alternatively, the user may perform a swipe gesture on the dock that reveals the drawer element.

Returning to FIG. 1, at step 110 the systems described herein may present, via the graphical user interface, the drawer element in response to receiving the input.

The systems described herein may present the drawer element in any suitable manner. In some examples, the drawer element may appear adjacent to and/or visually connected with the dock. For example, the dock may move from one side of a display area of the graphical user interface to the other and the drawer element may appear trailing the dock as the dock moves across the display area. As discussed earlier, in some examples, the dock may be persistently visible in a default viewing mode. In contrast, the drawer may not be persistently visible in the default viewing mode (but rather, e.g., be visible only when selected and only until it is dismissed).

The systems described herein may show the set of launch icons within the dock in any suitable manner. In some examples, the drawer element may present each launch icon within the set of launch icons ordered according to a single characteristic of the respective launch icons within the set of launch icons. For example, the drawer element may present the launch icons ordered by name (e.g., the name of their corresponding activities). In this manner, while the dock may provide dynamic, adaptive, and targeted navigability, the drawer may provide users with predictable, consistent, and comprehensive navigability.

In addition to or instead of showing the set of launch icons in alphabetical order, the systems described herein may show the set of launch icons (or a subset thereof) in another order. For example, the systems described herein may show launch icons ordered according to the most recently accessed corresponding activities. Thus, while the drawer element may provide comprehensive access to the set of activities, the drawer element may also facilitate quickly locating desired activities. In general, while the dock may show a limited set of launch icons based at least partly on anticipating what a user might find useful, relevant, and/or of interest, the drawer element may provide access to facilitate user-initiated searches of activities. In some examples, a greater proportion of space within the drawer element may be allocated to user-initiated searching for activities (e.g., by using arrangements friendly to user-directed searches such as alphabetical ordering and ordering by recent access) than is dedicated to the dock, while a greater proportion of space within the dock may be allocated to anticipating the user (e.g., recommended applications) than is allocated to the drawer.

Figure 3:
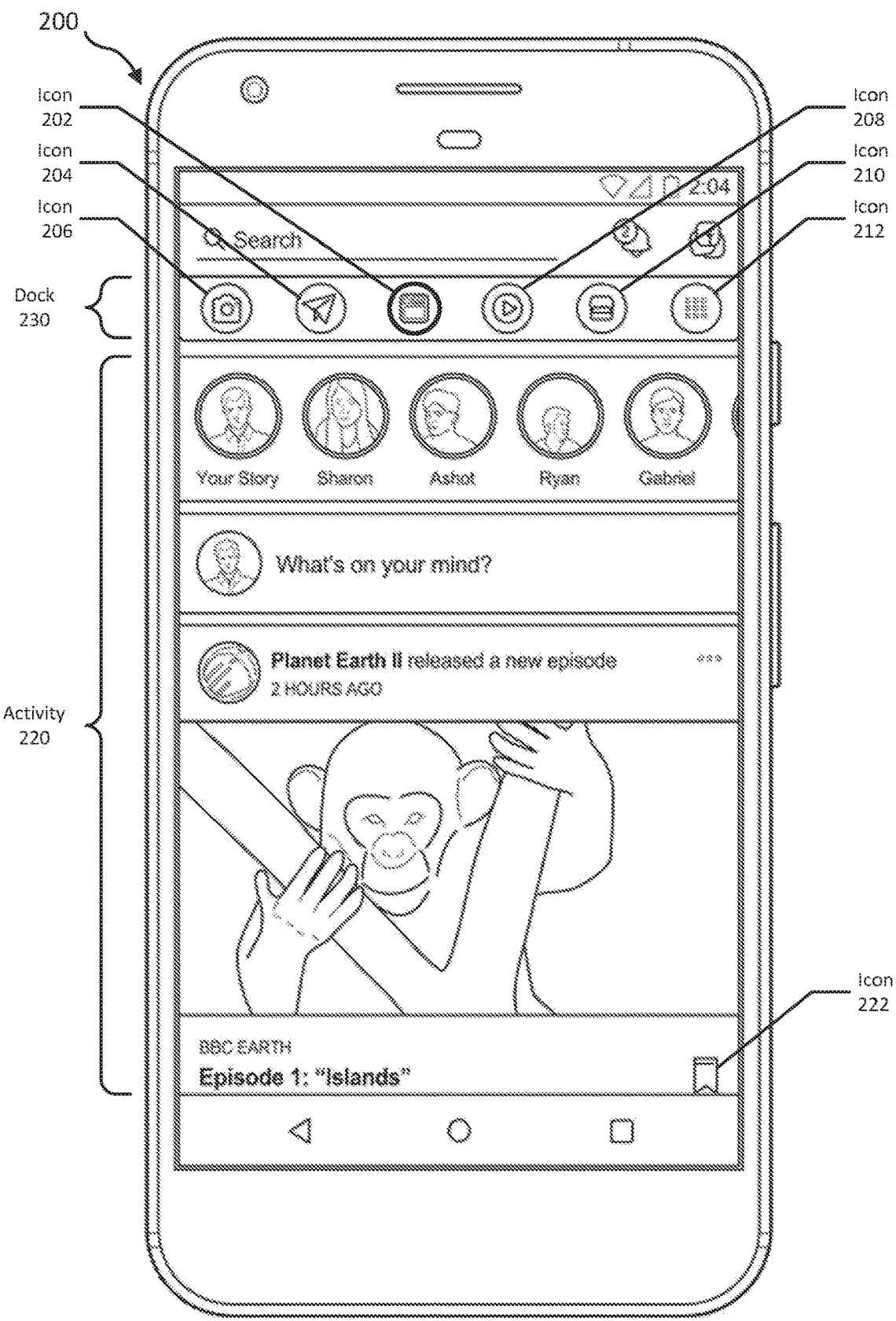
FIG. 3 is another illustration of an exemplary graphical user interface.

FIG. 2 illustrates an exemplary graphical user interface 200. As shown in FIG. 2, graphical user interface 200 may show an activity 220. Graphical user interface may also show a dock 230. Dock 230 may include icons 202, 204, 206, 210, and 212. In some examples, icons 202, 204, 206, and 210 may correspond to activities. For example, icon 202 (shown as currently selected in FIG. 2) may correspond to activity 220. In addition, icon 212 may provide access to a drawer element when selected. In some examples, the systems described herein may dynamically add icons to and/or remove icons from dock 230. For example, dock 230 may, at the start of a session, shown only icons 202, 204, 206, 210, and 212. In the course of the session, a user may select an icon 222 within activity 220. In this example, icon 222 may bookmark a video. As shown in FIG. 3, the systems described herein may respond to the user selecting icon 222 by adding an icon 208 for a video application to dock 230. In some examples, these systems may also show an animation in connection with the selection of icon 222 and in connection with adding icon 208 to dock 230. For example, an animation may show a copy of the embedded image of the monkey traveling to the newly added icon 208 to indicate to the user that the bookmarked video is available through the video application represented by icon 208. In this manner, the systems described herein may help the user discover the video application and the relationship between the video application and the selection of icon 222.

As may be appreciated by viewing FIGS. 2-3, a majority of graphical user interface 200 may be dedicated to displaying activity 220. In addition, graphical user interface 200 may persistently display dock 230 while also displaying the currently selected activity 220.

In some examples, a user may navigate to activities represented by icons within dock 230 by tapping on the icon of the desired activity. The display area shown as dedicated to activity 220 in FIG. 2 may then be dedicated to the newly selected activity. In some examples, a user may navigate to another activity by swiping the screen in the direction away from an icon adjacent to the currently selected icon. For example, to navigate from the activity represented by icon 202 to the activity represented by icon 204, the user might swipe from left to right. To navigate from the activity represented by icon 202 to the activity represented by icon 208, the user might swipe from right to left. In some examples, each activity may only contain one view, such that swiping once will switch from one activity to an adjacent activity. In other examples, some activities may contain multiple views. For example, the video application may contain one view for each bookmarked video. Thus, to proceed from icon 202 to icon 210 by swiping, the user might swipe from right to left once to proceed from icon 202 to icon 208, and then swipe multiple times to progress through different views (e.g., different bookmarked videos) provided by the video application represented by icon 208. After reaching the final video, an additional swipe from right to left may result in the selection of icon 210. As discussed earlier, in some examples, the systems described herein may dynamically add an icon to the dock adjacent to a currently selected icon within the dock. Thus, returning to the example where the user selected icon 222, resulting in icon 208 being added to dock 230, the systems described herein may have added icon 208 adjacent to icon 202 responsive to icon 202 being currently selected (thereby naturally facilitating navigation from the currently selected activity to the video application).

While dock 230 is pictured as spanning graphical user interface 200 horizontally, it may be appreciated that dock 230 may be vertical, radial, or take any other suitable form.

Figure 4:
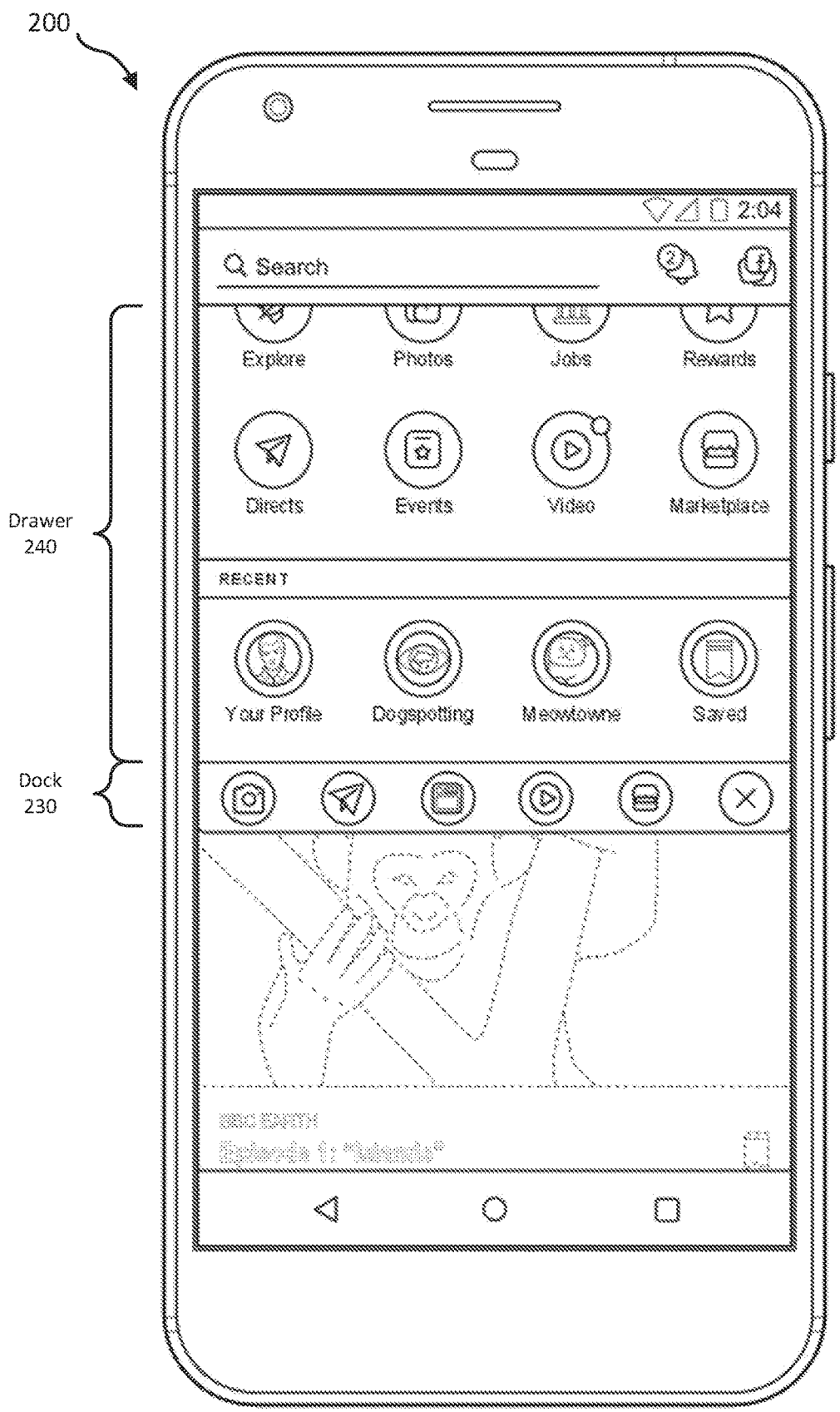
FIG. 4 is another illustration of an exemplary graphical user interface.

FIG. 4 illustrates graphical user interface 200 shortly after receiving an input from the user to open a drawer 240. As shown in FIG. 4, drawer 240 may be partly visible (e.g., because drawer 240 is partly opened). In some examples, the user may have selected icon 212 in FIG. 2 to open drawer 240. In other examples, the user may have swiped down on dock 230 to open drawer 240. As can be seen in FIG. 4, drawer 240 may be connected to dock 230. Thus, as dock 230 moves down across the screen, drawer 240 may appear, trailing drawer 240.

Figure 5:
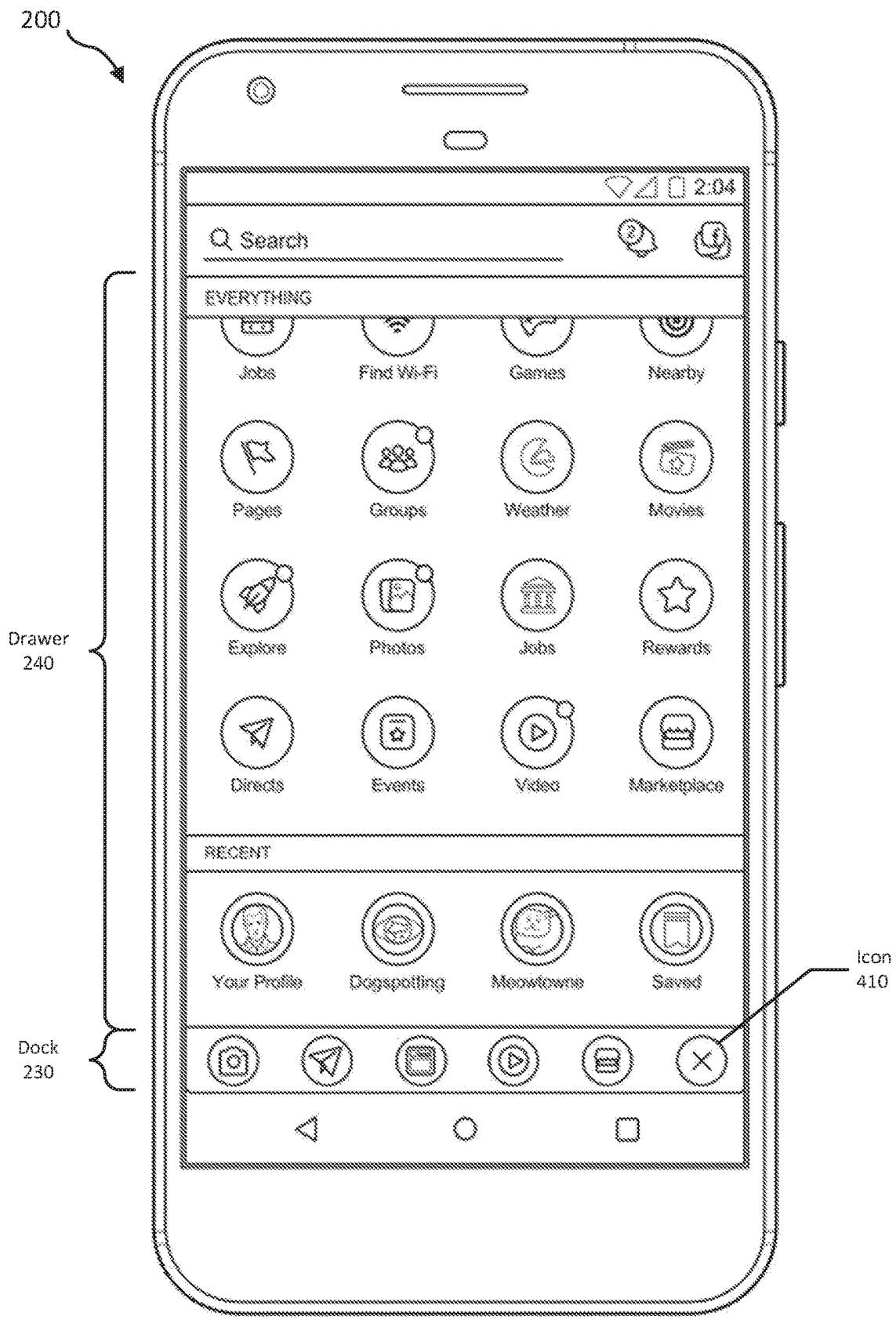
FIG. 5 is another illustration of an exemplary graphical user interface.

FIG. 5 illustrates graphical user interface 200 with drawer 240 fully visible. As shown in FIG. 5, drawer 240 may include an "EVERYTHING" section (which may include all available activities). Drawer 240 may also include a "RECENT" section (showing the four most recently selected activities). As drawer 240 is showing, icon 212 from FIG. 2 may be replaced with an icon 410 (e.g., for closing drawer 240). Additionally or alternatively, the user may close drawer 240 by swiping upward on dock 230. Even though drawer 240 consumes the majority of the display area, some icons within drawer 240 may not be visible.

Figure 6:
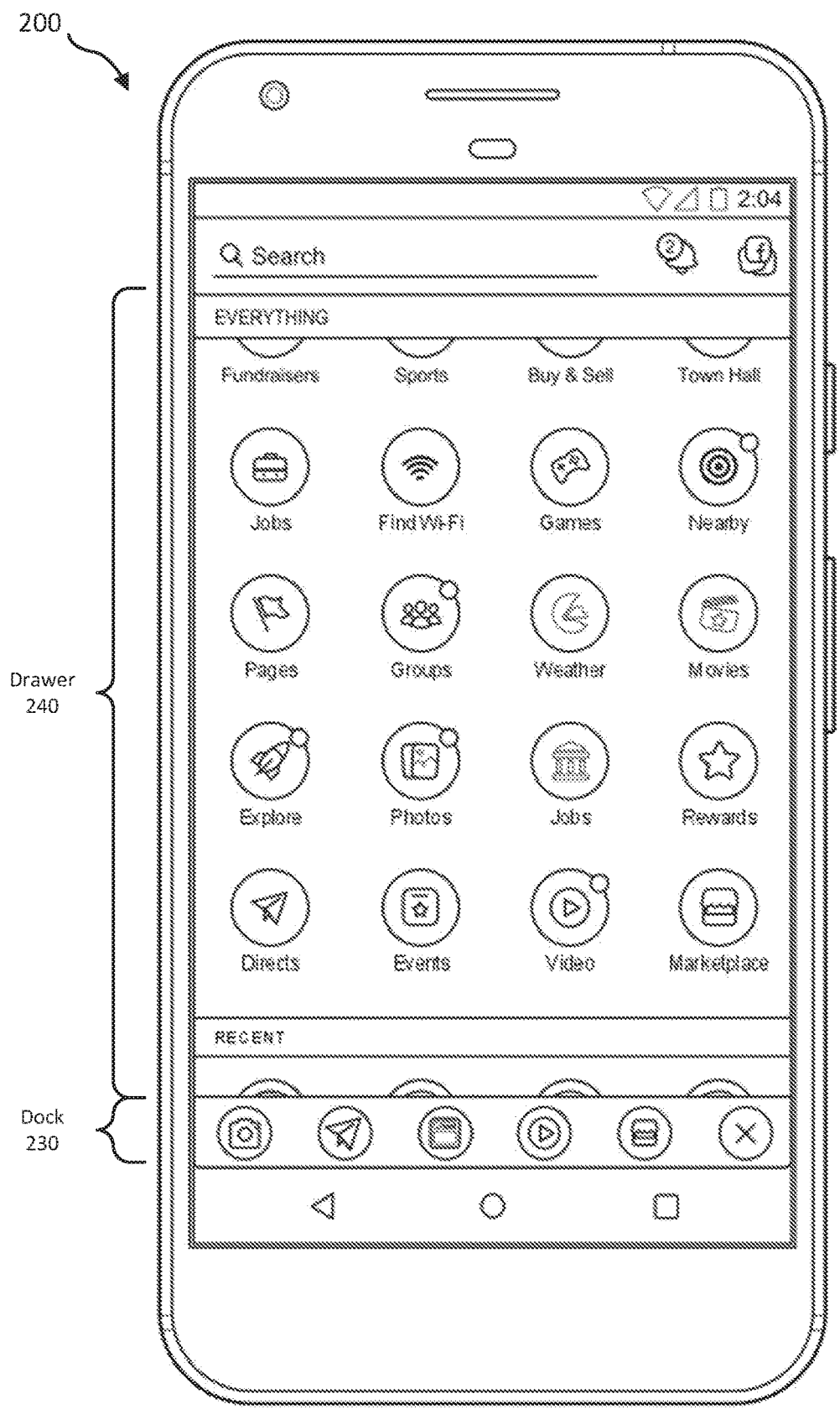
FIG. 6 is another illustration of an exemplary graphical user interface.

FIG. 6 illustrates graphical user interface 200 with drawer 240 partially scrolled. As shown in FIG. 6, dock 230 may remain visible at the bottom of the display area even as the contents of drawer 240 continue to scroll (e.g., allowing the user to scroll through drawer 240 without dock 230 disappearing).

Figure 7:
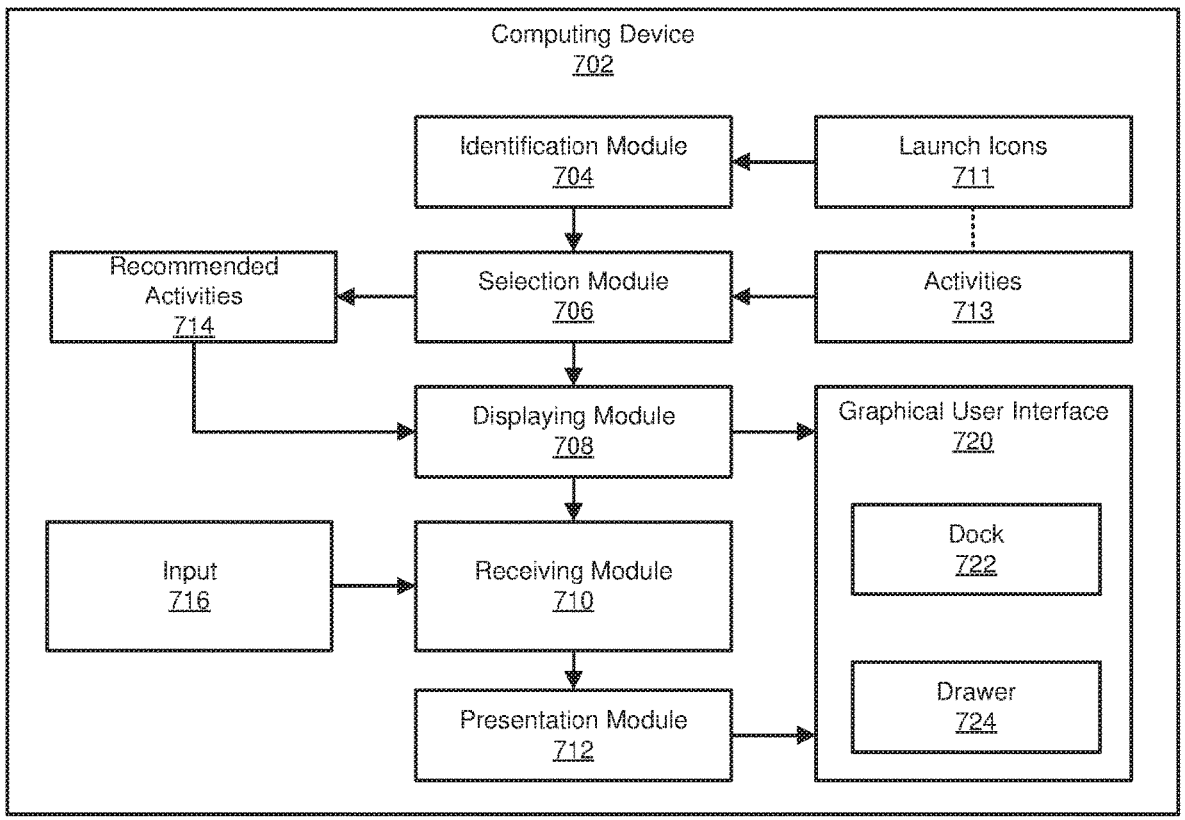
FIG. 7 is a block diagram of an exemplary system for providing adaptive and predictable graphical user interfaces.

FIG. 7 illustrates an exemplary system 700 for providing adaptive and predictable graphical user interfaces. As shown in FIG. 7, system 700 may include a computing device 702. Computing device 702 may include a graphical user interface 720. Computing device 702 may also include an identification module 704, a selection module 706, a displaying module 708, a receiving module 710, and a presentation module 712. In one example, identification module 704 may identify launch icons 711 for graphical user interface 720, where each of launch icons 711 navigates to a corresponding activity within activities 713 when selected via graphical user interface 720. Selection module 706 may then select, from activities 713 and based on at least one recommendation criterion, recommended activities 714 for a user that interacts with graphical user interface 720. Displaying module 708 may then display, via graphical user interface 720, a dock 722 that includes a subset of launch icons 711 corresponding to recommended activities 714. Receiving module 710 may then receive, via graphical user interface 720, an input 716 to view a drawer 724 that includes each of launch icons 711. Finally, presentation module 712 may present, via graphical user interface 720, drawer 724 in response to receiving input 716.

As explained above, the systems and methods described herein may provide a navigation system for computer operating systems and applications (e.g., social media applications). A graphical user interface may include an adaptable, dynamic icon dock (or "shelf") that is complimented by a stable and predictable icon "drawer." Icons within the dynamic shelf may be automatically added, removed, rearranged, highlighted, or otherwise customized based on a variety of information, including user behavior (by, e.g., populating the shelf with icons associated with a user's most-used applications), user-specific data (by, e.g., populating the shelf with a calendar icon and/or notification to alert a user about upcoming events sensor-based information (by, e.g., populating the shelf with an icon for local recommendations when a user is traveling), among many others. The drawer, in contrast, may house all application icons and may be arranged alphabetically, based on recency of use, etc., giving users a predictable way to access applications and tasks.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

The term "memory device," as used herein, generally represents any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In addition, the term "physical processor," as used herein, generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive recommendation data to be transformed, transform the recommendation, output a result of the transformation to a graphical user interface, use the result of the transformation to dynamically modify a dock to reflect the recommendation data, and store the result of the transformation to provide quick access to an application. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The term "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method comprising:
    identifying a set of launch icons for a graphical user interface, each launch icon within the set of launch icons navigating to a corresponding activity within a set of activities when selected via the graphical user interface;
    selecting, from the set of activities and based on at least one recommendation criterion, a smaller subset of recommended activities for a user that interacts with the graphical user interface, wherein the at least one recommendation criterion comprises identifying a recommendation of a candidate activity from a vendor of the candidate activity;
    persistently displaying, via the graphical user interface, a dock that comprises a subset of launch icons corresponding to the subset of recommended activities;
    receiving, via the graphical user interface, an input to view a drawer element, wherein the drawer element comprises each launch icon within the set of launch icons; and
    presenting, via the graphical user interface, the drawer element in response to receiving the input.

2. The method of claim 1, further comprising dynamically modifying the dock to include an additional launch icon from the set of launch icons corresponding to an additional recommended activity from the set of activities in response to determining that the additional recommended activity meets the at least one recommendation criterion.

3. The method of claim 2, wherein dynamically modifying the dock to include the additional launch icon comprises modifying the dock to include the additional launch icon proximate to a currently selected launch icon within the dock responsive to the currently selected launch icon being currently selected.

4. The method of claim 1, further comprising dynamically modifying the dock to remove a lapsed launch icon corresponding to a lapsed activity from the dock in response to determining that the lapsed activity is not currently recommended to the user.

5. The method of claim 1, wherein the recommendation criterion comprises determining, based on non-user-entered sensor data, that the candidate activity within the set of activities is relevant to the user.

6. The method of claim 5, wherein the recommendation criterion comprises:
determining a characteristic of a physical environment of the user based on the non-user-entered sensor data; and
determining that the characteristic of the user's physical environment provides a parameter that is consumable by the candidate activity.

7. The method of claim 5, wherein the recommendation criterion comprises:
determining a characteristic of a physical environment of the user based on the non-user-entered sensor data; and
determining, based on a pre-defined specification and based at least in part on the characteristic, that the candidate activity is suited for the user's physical environment.

8. The method of claim 1, wherein the recommendation criterion comprises determining, based on data specific to the user stored in relation to the candidate activity within the set of activities, that the candidate activity is currently relevant to the user.

9. The method of claim 1, wherein the recommendation criterion comprises determining, based on data specific to the user stored in relation to a first activity within the set of activities, that a second activity within the set of activities is currently relevant to the user.

10. The method of claim 1, wherein the recommendation criterion comprises determining that another user that is connected to the user according to stored relationship data has used the candidate activity within the set of activities.

11. The method of claim 1, wherein the recommendation criterion comprises determining at least one of:
how recently the candidate activity was accessed by the user; or
how frequently the candidate activity was accessed by the user.

12. The method of claim 1, wherein receiving the input to view the drawer element comprises receiving the input via an interaction with the dock within the graphical user interface.

13. The method of claim 1, wherein selecting, from the set of activities, the smaller subset of recommended activities comprises:
selecting a first recommended activity based at least in part on a first recommendation criterion; and
selecting a second recommended activity based at least in part on a second recommendation criterion.

14. The method of claim 1, wherein the drawer element presents each launch icon within the set of launch icons ordered according to a single characteristic of the respective launch icons within the set of launch icons.

15. The method of claim 1, wherein the drawer element presents each launch icon within the set of launch icons in an order based on information about the set of launch icons that is available to the user.

16. The method of claim 1, wherein:
the dock is persistently visible within the graphical user interface in a default viewing mode; and
the drawer element is not visible within the graphical user interface in the default viewing mode until the user selects the drawer element via the graphical user interface.

17. The method of claim 1, wherein the graphical user interface displays a single activity within the set of activities at a time.

18. A system comprising:
an identification module, stored in memory, that identifies a set of launch icons for a graphical user interface, each launch icon within the set of launch icons navigating to a corresponding activity within a set of activities when selected via the graphical user interface;
a selection module, stored in memory, that selects, from the set of activities and based on at least one recommendation criterion, a smaller subset of recommended activities for a user that interacts with the graphical user interface, wherein the at least one recommendation criterion comprises identifying a recommendation of a candidate activity from a vendor of the candidate activity;
a displaying module, stored in memory, that persistently displays, via the graphical user interface, a dock that comprises a subset of launch icons corresponding to the subset of recommended activities;
a receiving module, stored in memory, that receives, via the graphical user interface, an input to view a drawer element, wherein the drawer element comprises each launch icon within the set of launch icons;
a presentation module, stored in memory, that presents, via the graphical user interface, the drawer element in response to receiving the input; and
at least one physical processor that executes the identification module, the selection module, the displaying module, the receiving module, and the presentation module.

19. A computer-readable medium comprising:
one or more computer-readable instructions that, when executed by at least one processor of a computing device, cause the computing device to:
identify a set of launch icons for a graphical user interface, each launch icon within the set of launch icons navigating to a corresponding activity within a set of activities when selected via the graphical user interface;
select, from the set of activities and based on at least one recommendation criterion, a smaller subset of recommended activities for a user that interacts with the graphical user interface, wherein the at least one recommendation criterion comprises identifying a recommendation of a candidate activity from a vendor of the candidate activity;
persistently display, via the graphical user interface, a dock that comprises a subset of launch icons corresponding to the subset of recommended activities;
receive, via the graphical user interface, an input to view a drawer element, wherein the drawer element comprises each launch icon within the set of launch icons; and
present, via the graphical user interface, the drawer element in response to receiving the input.

* * * * *